United States Patent
Janssen et al.

[11] Patent Number: 5,824,276
[45] Date of Patent: Oct. 20, 1998

[54] METHOD AND APPARATUS FOR UNIFORMLY DISPERSING ARTICLES IN A TREATMENT SOLUTION

[75] Inventors: Robert A. Janssen, Alpharetta; Barbara L. Heyl, Atlanta; Roger J. Hoffman, Cumming; Thomas E. Shank, Sugar Hill, all of Ga.

[73] Assignee: CIBA Vision Corporation, Duluth, Ga.

[21] Appl. No.: 629,288

[22] Filed: Apr. 8, 1996

Related U.S. Application Data

[63] Continuation of Ser. No. 349,716, Dec. 5, 1994, Pat. No. 5,665,420.

[51] Int. Cl.$^6$ .................................................. A61L 9/00
[52] U.S. Cl. ........................... 422/292; 134/42; 422/293; 422/297; 422/300
[58] Field of Search ................................... 422/292, 293, 422/297, 300; 134/42

[56] References Cited

U.S. PATENT DOCUMENTS

| | | | |
|---|---|---|---|
| 4,094,058 | 6/1978 | Yasutake et al. | |
| 4,468,229 | 8/1984 | Su | 8/507 |
| 4,553,975 | 11/1985 | Su | 8/507 |
| 4,559,059 | 12/1985 | Su | 9/507 |
| 4,954,132 | 9/1990 | Hung et al. | 8/507 |
| 5,021,068 | 6/1991 | Hung et al. | 8/507 |
| 5,082,558 | 1/1992 | Burris | 422/300 X |
| 5,184,633 | 2/1993 | Langford | 422/292 X |
| 5,443,801 | 8/1995 | Langford | 422/294 |

FOREIGN PATENT DOCUMENTS

WO8605528  9/1986  WIPO .

*Primary Examiner*—Krisanne Thornton
*Attorney, Agent, or Firm*—R. Scott Meece; Michael U. Lee

[57] ABSTRACT

An apparatus and method for uniformly contacting an article with a treatment solution. Preferred embodiments are methods of uniformly tinting of contact lenses or uniformly surface modifying contact lenses. The method involves suspending the lens in the treatment solution by application of fluid flow, preferably sinusoidal or pulsed, in a direction opposite the stagnant force (i.e., sum of buoyancy and gravity forces) on the article. The fluid flow prevents the lens from contacting the container structure for periods sufficient to cause non-uniform treatment conditions, while continuously mixing the treatment solution to maintain uniform concentrations throughout.

8 Claims, 2 Drawing Sheets

METHOD AND APPARATUS FOR UNIFORMLY DISPERSING ARTICLES IN A TREATMENT SOLUTION

This application is a division of application Ser. No. 08/349,716, filed Dec. 5, 1994 now U.S. Pat. No. 5,665,420.

BACKGROUND OF THE INVENTION

1. Field of the Invention

This invention relates broadly to methods of chemically treating articles in solutions. In a preferred embodiment, this invention relates to uniformly dispersing opthalmic lenses in a chemical treatment solution.

2. Description of the Related Art

Hydrophilic contact lenses may be treated with a variety of solutions in a variety of ways to modify the lens properties. For example, contact lenses are typically subjected to extraction processes during the manufacture of the lens in order to remove undesirable solvents originating from the polymerization or molding steps. A contact lens may also be exposed to a treatment solution containing a reactive dye, in order to impart ultraviolet (UV) light absorbing properties or visible light absorbing properties to the lens. Another example of contact lens treatment involves exposure of the lens to a monomer solution with graft polymerization being induced to alter the surface properties of the lens.

Conventional means of tinting contact lenses may be divided into bath processes and printing processes. In the printing process, a silicone rubber printing head conveys a reactive dye to the surface of the lens. In the bath process, the lens, or a portion of the lens, is immersed in a solution containing a reactive dye.

In order to efficiently and economically tint lenses, one may treat many lenses at one time by placing the lenses in a container holding the reactive dye solution in a static state. A problem with this method of treatment is that the lenses may cup or coalesce (i.e., two or more lenses may adhere to one another), thereby promoting localized dye concentration gradients. Also, the lens may rest against the container, again resulting in the lens experiencing different dye concentrations across the surface. These concentration gradients result in non-uniform tinting of the lens, sometimes causing serious discolorations in the lens surface. Further, lens coalescing generates problems with separating the lenses because of the strong adhesion between lenses.

The lenses may also be treated by placing each lens in a separate well or compartment within a tray having numerous wells. Typically, the lenses are placed concave-side up in wells which are adapted to hold the lens (i.e., the wells are typically concave-shaped to match the convex surface of the lenses). Such a tray holding numerous lenses may be immersed in a tinting or monomer grafting solution in order to efficiently treat many lenses at once. Although this technique eliminates the coalescing problems,, there remain problems associated with the lenses resting against the tray wells. For example, an extended contact period of the lens with the tray causes concentration gradients, resulting in lenses which are non-uniformly tinted or non-uniformly surface-modified.

Thus, there is a need for a method of exposing contact lenses to a treatment solution in an efficient, economical, and uniform manner. There also remains a need for an apparatus which simultaneously contacts numerous lenses with a treatment solution in a uniform manner.

SUMMARY OF THE INVENTION

An object of the invention is to provide a method of suspending an article in treatment solution for an extended time period.

Another object of the invention is to provide a method of uniformly contacting an article with a chemical treatment solution for an extended period.

A further object of the invention is to provide a method of uniformly tinting an ophthalmic lens by application of a tinting solution to the entire lens surface.

Yet another object of the invention is to provide a method of increasing the efficiency of a contact lens tinting process.

Yet a further object of the invention is to provide a method of efficiently and uniformly graft-polymerizing monomers or macromers to the surface of an ophthalmic lens.

One embodiment of the invention is a method for uniformly contacting articles with a chemical treatment solution. The method includes suspending the article in a solution within a container such that the article does not experience substantial or extended contact with the container interior. A predetermined flow of solution is passed into the container, thereby providing an upward force which, in conjunction with the buoyancy force, overcomes the downward gravitational force on the article, when the article is more dense than the solution. Alternatively, if the article has a lower density than the treatment solution, the flow is generated at the top of the container, to produce a substantially steady state effect.

In one preferred embodiment, the solution flow is applied in an oscillatory fashion, so that the article moves up and down within the container but does not contact the container for an extended time period. In another embodiment, the flow is pulsed, i.e., turned on and off, such that an oscillatory flow pattern is achieved. In a preferred embodiment, the solution flow is passed through a dispersion member, thereby uniformly distributing the upward force across the cross-section of the container and eliminating dead space.

In a preferred embodiment, a method of treating contact lenses is disclosed. The method includes placing a contact lens in a container including a treatment solution, e.g. a tinting solution, or a monomeric or macromeric solution. The method further includes applying solution flow from the bottom of the container (if the article is more dense than the solution), thereby generating an upward force on the lens sufficient to prevent the lens from coalescing or contacting the container for an extended time period. In a more preferred embodiment, the method includes applying solution flow to the container in a cyclic fashion, including a point of maximum upward flow and a point of no flow, through a dispersion member located across a section of the container which is perpendicular to the direction of gravity.

In another embodiment, articles having substantially the same density as a treatment solution are dispersed within the treatment solution within a container, maintaining the articles away from the container walls. In this embodiment, applied forces are exerted from both the top and bottom of the container, by passing solution into the container from both above and below the articles.

The invention further includes contact lenses formed by uniformly dispersing the lenses within a chemical treatment solution while preventing the lenses from having substantial contact with the container.

DESCRIPTION OF THE PREFERRED EMBODIMENTS

Figure 1:
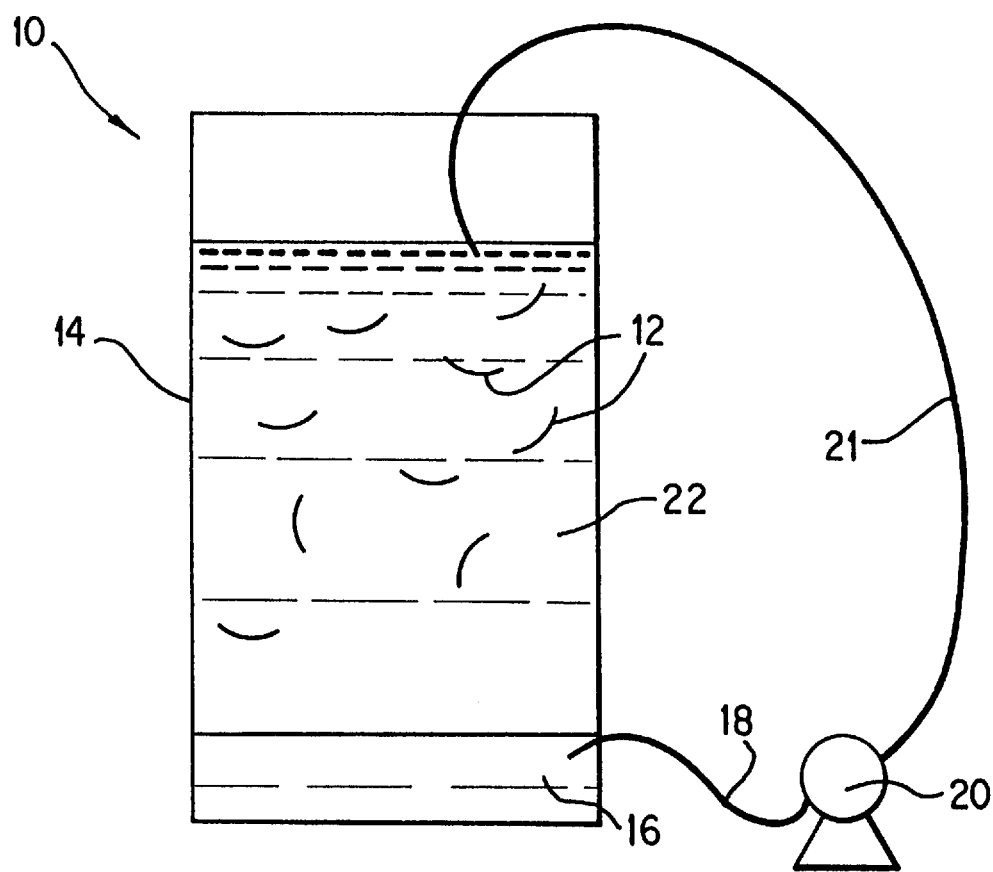
FIG. 1 is a side sectional view of a contact lens treatment system having lenses dispersed in bulk in a treatment solution.

In order to enhance the reader's understanding of the invention, select terms will be defined prior to the detailed description of the invention.

An "article", as used herein, refers to a wide variety of components which may be treated in a treatment solution. For example, an article includes, without limitation thereto, ophthalmic lenses, medical devices such as transdermal patches having hydrogel components, capsules or pills or components thereof, articles of clothing, decorative and aesthetic polymeric components, and foodstuffs. Thus, while the present invention is discussed with reference to the preferred article of treatment, i.e., ophthalmic lenses, the invention is not limited to the treatment of lenses.

An "ophthalmic lens", as used herein, refers to any lens intended for use in intimate contact with the eye of the user. This includes, without limitation, intraocular lenses, ocular implants, hard contact lenses, and soft contact lenses. The preferred treatment article of the present invention is a hydrophilic contact lens.

A "chemical treatment solution", as used herein, means a solution intended for contact with an article in order to change the characteristics of the article. Thus, a "chemical treatment solution" includes treatment solutions having chemical species which are reactive, or are intended for reaction with, the article, such as reactive dyes (e.g., halotriazine or vinyl sulfone dyes) or hydrophilic or hydrophobic monomers or macromers or the like. "Chemical treatment solution" also includes solvents such as alcohols, saline solutions, or sterile water, which are intended to extract chemical species from the article to be treated.

A "container", as the term is used herein, means any structure shaped such that it is capable of retaining liquid therein. Containers include, without limitation thereto, wells in a tray which are shaped to receive and retain a contact lens and sufficient solution to fully immerse the contact lens. Containers also include those receptacles capable of receiving and retaining a plurality of lenses and treatment solution sufficient to fully immerse the plurality of lenses.

"Surface modification", as used herein, refers to treating an article to alter its surface properties. For example, the surface modification of a contact lens includes, without limitation, the grafting of monomers or macromers onto polymers to make the lens biocompatible, deposit resistant, more hydrophilic, more hydrophobic, or to impart antimicrobial or antifungal properties.

"Tinting", as used herein, refers to treating an article to change the article's light-absorbing properties. For example, the tinting of a contact lens includes, without limitation, reducing the ultraviolet, infrared, or visible light transmission through the contact lens.

"Stagnant force", as used herein, is the vector sum of the force of gravity and the buoyancy force on an article in solution, absent applied forces from external fluid flow. The buoyancy force is the upward force which a solution exerts on an article in contact with the solution. For example, if an article is more dense than a solution in which it is immersed, the gravitational force is larger than the buoyancy force, so the direction of stagnant force on the article is downward, and the article will sink, absent applied forces.

Broadly speaking, the invention is a method of increasing the uniformity of treatment of an article in a treatment solution retained within a treatment container. The treatment uniformity is enhanced by applying an upward force on the article, such that the article is suspended in the treatment solution and does not rest against the treatment container. While this may be accomplished by a number of techniques, the preferred method involves pumping solution into the container from a point either (1) below the article to be treated, if the article is more dense than the solution, or (2) above the article, if the article is less dense than the solution. This provides an upward (or downward) force on the article which, in conjunction with the upward buoyancy force on the article, counterbalances the downward gravitational force. This flow maintains the article in a substantially steady state, immersed within the solution, but held away from the container walls. In addition, the pump generates mild solution mixing, thereby reducing localized concentration gradients and further improving treatment uniformity.

A preferred embodiment of the invention is a method of uniformly treating ophthalmic lenses, especially contact lenses. The method involves suspending the lenses in the treatment solution without allowing the lenses to coalesce or contact the container for an extended period of time. An "extended period of time", as used herein, means a time sufficient to allow the lenses to be treated non-uniformly such that the aesthetic or functional utility of the lens is substantially impaired. For example, if after the tinting process is complete, the lens has a mark which can be visually detected with the naked eye, the lens has been in contact with the container or another lens for an extended period of time.

Contact lenses may be treated in accordance with the teachings of this invention by treatment "in bulk", i.e., where many lenses are treated in a single container which allows lens-to-lens contact. FIG. 1 illustrates a bulk lens treatment system in which a plurality of lenses are simultaneously suspended in a treatment solution. The FIG. 1 system is designed to treat lenses which have a density greater than the treatment solution, by providing an upward flow to balance the downward gravitational force on the lenses. Treatment system 10 includes a container 14 in which treatment solution 22 suspends lenses 12. The container includes a dispersion member 16 located near the bottom of the container. Feed line 18 connects pump 20 to dispersion member 16. Return line 21 provides feed solution to pump 20 from the top of container 14.

In operation, pump 20 provides fluid flow through feed line 18 into dispersion member 16. A substantially uniform pressure is provided to the container by passing solution through dispersion member 16, thereby avoiding dead space, i.e., areas of little or no solution flow. The upward force generated by this fluid pressure enables lenses to remain in suspension in the solution. In addition, the solution flow minimizes the possibility of lens coalescing. Further, the solution flow causes mixing which enhances the uniformity of the solution concentration.

While contact lenses may be treated in a bulk suspension, as illustrated in FIG. 1, a preferred method of treating contact lenses requires the use of a plurality of separate lens-retaining containers affixed to one another for convenience of bulk processing. For example, one method involves placing each lens in an individual well in a tray which includes a plurality of wells. This method has certain advantages, such as entirely eliminating the possibility of lens coalescence and facilitating quality inspections of individual lenses.

Figure 2:
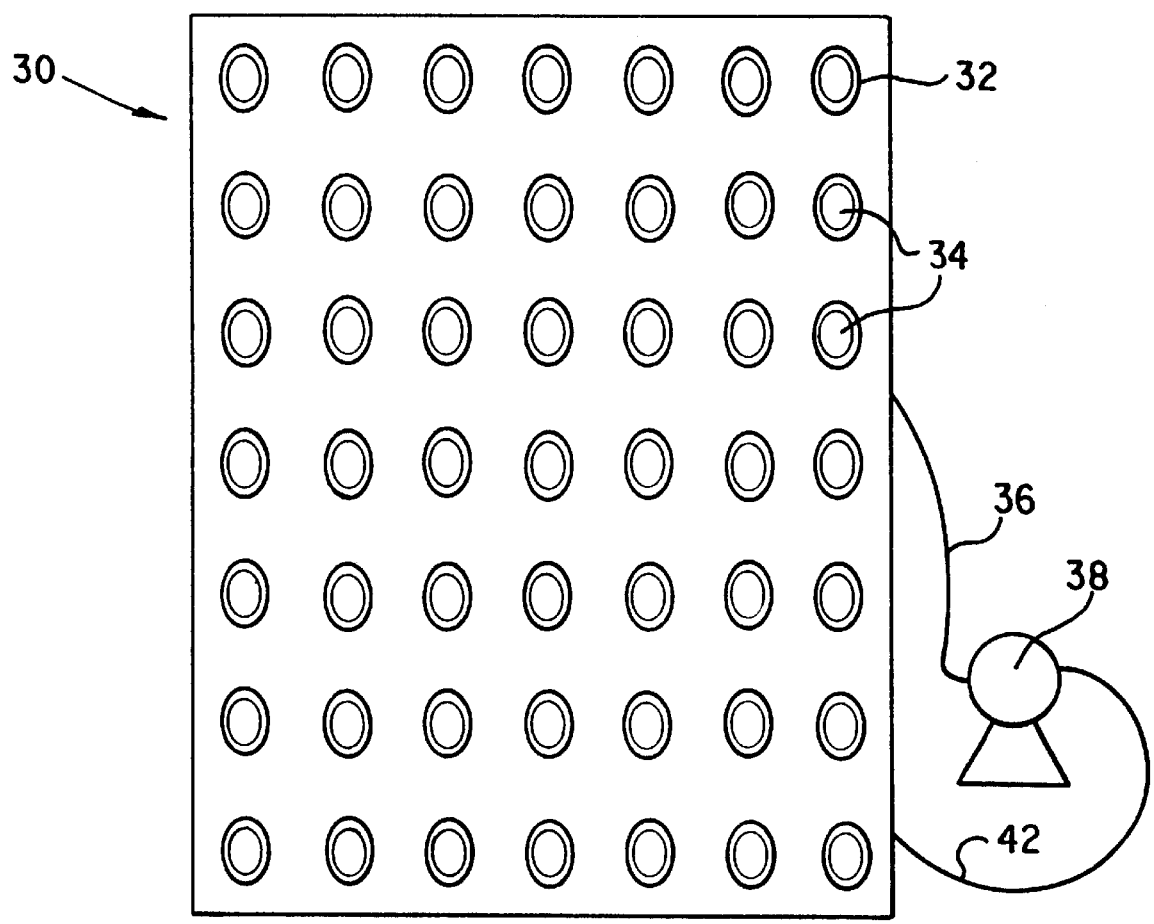
FIG. 2 is a plan view of a contact lens treatment system of the present invention including a lens-retaining tray.

Referring to FIG. 2, a preferred contact lens treatment system is shown. System 30 includes tray 32 having a plurality of wells 34 formed therein. Wells 34 are sized large enough to receive a contact lens and sufficient treatment solution to immerse the lens. Also, wells 34 are preferably sized sufficiently large to allow the lens (not shown) to move slightly up and down during the treatment process.

Figure 3:
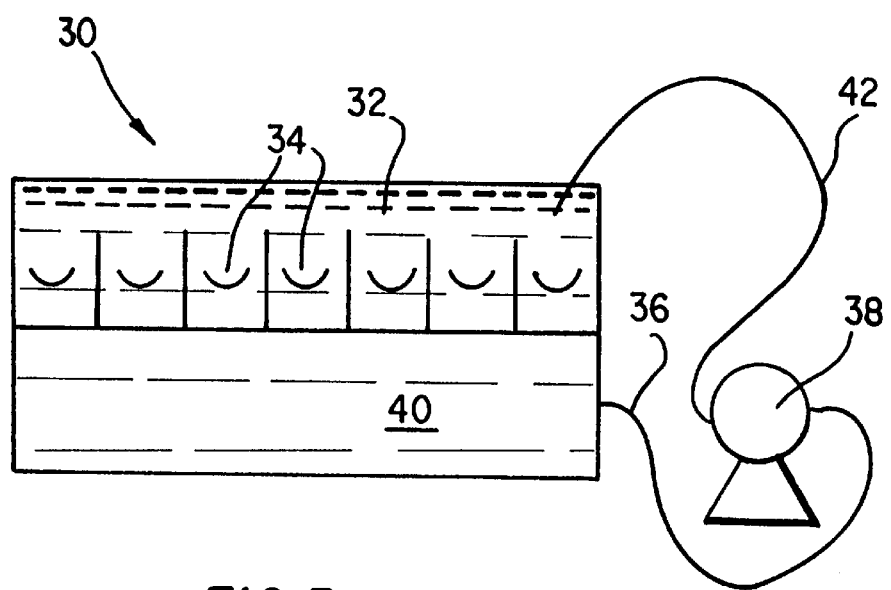
FIG. 3 is a side sectional view of the contact lens treatment tray of FIG. 2.

FIG. 3 is a side sectional view of the treatment system of FIG. 2, showing pump 38 connected via feed conduit 36 to dispersion member 40. Return conduit 42 provides return flow of solution to pump 40. Dispersion member 40 is located in intimate contact with tray 32 all along one surface of the tray. Thus, a fluid path extends from pump 38 through conduit 36 and dispersion member 40 to each well 34 of tray 32.

Pump 38 may be selected from a wide variety of liquid pumps, including without limitation, centrifugal pumps and diaphragm pumps. However, the preferred pump is a pump capable of generating a pulsed or variable force on the lens in the well. A preferred pump is capable of delivering an outward solution flow in a repetitive cycle, thereby causing the lenses to remain in a substantially steady state movement pattern within the solution. More preferable is a pump capable of delivering flow rates in a sinusoidal cycle, such that there exists a maximum outward flow amplitude and a minimum flow amplitude in each cycle. Thus, a preferred pump is a diaphragm pump.

A diaphragm pump is also preferred because such a pump can generate a sinusoidal flow rate regime, i.e., a plot of flow rate v. time is sinusoidal in shape. The sinusoidal flow allows the fluid conditions to pass from turbulent to laminar in a repeating cycle. The sinusoidal flow regime is believed to enhance the mixing of the solution within the tray wells, thereby minimizing localized concentration gradients which can result in non-uniform lens treatment.

In operation, pump 38 forces fluid through conduit 36 into dispersion member 40. Dispersion member 40 allows the force of the fluid flow from the pump to be uniformly dispersed across the cross-sectional area of the tray. In this way, each of the lenses in each of the wells receives an equal pressure. Also, the pressure across each well is uniform. This uniformity prevents the lens from migrating to one side of the well and remaining there.

Dispersion member 40 may be formed from a wide variety of materials suited to distributing the flow uniformly across the dispersion member. Thus, the dispersion member may be formed from a glass or ceramic frit material, i.e., a inert material having a plurality of pores having a small diameter, usually ranging from 10 microns to 1 millimeter. Alternatively, the dispersion member may be a plate including a series of uniformly-dispersed preformed openings having a predetermined geometry (e.g., a metal plate having circular holes formed therethrough)

In another embodiment of the invention, the articles to be treated have substantially the same density as a treatment solution (i.e., the article density is within about 1% of the solution density). In order to disperse the articles within the treatment solution applied forces are exerted from both the top and bottom of the container. This may be accomplished by means described above, with the difference being that solution is passed into the container from both above and below the articles. Return flow conduits may be positioned above the upper inlet and below the lower inlet, thereby generating an eddy effect, without causing the article to be attracted to the return conduit port. However, a wide variety of other configurations may be possible.

The previous disclosure will enable one having ordinary skill in the art to practice the invention. In order to better enable the reader to understand specific embodiments and the advantages thereof, reference to the following examples is suggested.

EXAMPLE I

Thirty vilfilcon hydrophilic contact lenses containing about 55% water are placed in a 6 liter cylinder having a cross-sectional area of about 78 cm$^2$. The cylinder contains about 3 liters of deionized water. The output of a centrifugal pump (TE-5C-Md, March, Glenview, Ill.) is connected by tubing to a jet nozzle having a diameter of 0.5 cm. which is located on the side of the cylinder near the bottom. The feed line to the pump is connected via tubing to the top of the cylinder. The Reynold's Number, i.e. $\rho vD/\mu$, is about 6000, placing the fluid flow exiting the nozzle in the turbulent regime.

This arrangement maintains the lenses separate from each other and from the container. In addition, the lenses are in continuous motion, and the treatment solution is well mixed.

EXAMPLE II

An arrangement similar to that of Example I is prepared, with the exception that a diaphragm pump is used in place of a centrifugal pump. The diaphragm pump (Pulsa 680, Pulsa Feeder, Rochester, N.Y.) produces an impulse jet fluid flow, i.e., a plot of the flow rate versus time yields a sinusoidal function. In this flow pattern, the Reynold's Number varies from laminar to turbulent in a cyclic fashion, with the pulse and frequency rate being adjustable.

Thirty lenses are placed in the cylinder described in Example I with three liters of distilled water. As the pulse rate is increased to about 150 cycles per minute, the steady state location of the group of lenses moved up the cylinder. However, the lenses remain well dispersed within the water, and separated from one another and the cylinder walls.

EXAMPLE III

A coarse porous glass disc is placed in the bottom of a 300 milliliter cylinder having a cross-sectional area of 12 cm$^2$, with the glass disc spanning the cross-section of the cylinder. The glass disc is sized such that no substantial flow can pass from below the glass disc to above the disc without passing through the disc. About 200 milliliters of distilled water is placed in the cylinder. A contact lens is placed in the distilled water. A diaphragm pump is connected to the cylinder with the discharge of the pump at the bottom of the cylinder and the return at the top, as in Example I. The pump is turned on and the pulse frequency is adjusted so that the lens oscillates up and down slightly at a location near the center of the treatment fluid volume.

The porous glass disc enables the pressure exerted by the pump fluid to be uniformly distributed across the cylinder cross-section. This uniform pressure distribution prevents the development of a dead space, i.e., an area of static fluid, thereby further enhancing the uniformity of treatment.

COMPARATIVE EXAMPLE IV

This Example illustrates the problems associated with a conventional method of bath tinting a contact lens in a tray having numerous lens-retaining wells.

A contact lens is placed in a conventional contact lens tray having semi-spherical lens retaining wells with dimensions of about 15 mm inner diameter and a one mm gap. The lens tray is placed in the cylinder with a solution of reactive (vinyl sulfone) blue dye (RAMAZOL, Hoechst-Celanese Co.), which includes about 10 weight percent sodium phosphate tribasic to cause the dye to chemically bond to the lens polymer matrix. The temperature of the solution is held at about 45° C. The solution remains motionless while the tinting reaction occurs over about a 45 minute period. The lens rests against a portion of the well during the tinting process.

The resulting lens is tinted, but the lens has marks on the surface where there was extended contact with the well. The static nature of the solution contributes to the dye concentration gradient which the lens surface experiences when resting on the well.

EXAMPLE V

This Example illustrates a preferred method of uniformly tinting hydrophilic contact lenses.

A contact lens is placed in a conventional contact lens tray having semi-spherical lens retaining wells with dimensions of about 15 mm inner diameter and a one mm gap, as in EXAMPLE IV. The lens tray is placed in a cylinder having a porous glass disc at the bottom of the cylinder, as per EXAMPLE III. A solution of reactive blue dye and 10 weight percent sodium phosphate tribasic is pumped at a controlled frequency from a diaphragm pump through the glass disc and into the tray wells. The lens is exposed to the tinting solution at a temperature of about 45° C. for a period of about 45 minutes.

The resulting contact lens has a darker tint appearance than the lens produced in accordance with the Example IV procedure. The tint of the resulting lens is entirely uniform in appearance when evaluated by the naked eye. No markings appear on the lens surface.

The invention has been described in detail, with reference to certain preferred embodiments, in order to enable the reader to practice the invention without undue experimentation. However, a person having ordinary skill in the art will readily recognize that many of the previous components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims.

That which is claimed is:

1. An apparatus for uniformly treating an ophthalmic lens in a chemical treatment solution, wherein the lens has a density differing from the treatment solution, comprising:
   (a) a tray having a plurality of wells, each well capable of receiving and retaining a contact lens and sufficient solution to immerse said lens;
   (b) a pump in fluid connection with said wells, said pump capable of passing solution substantially vertically into said wells,
wherein the pump is capable of applying a force on the lens for a period of time by applying a solution flow opposite the direction of the stagnant force on the article, said applied force being sufficient to prevent said lens from contacting said well for an extended period of time, and said solution flow causing mixing of said solution, thereby enhancing uniformity of article treatment by reducing localized concentration gradients due to container proximity or static conditions.

2. An apparatus of claim 1, wherein said pump is connected to said wells through a plurality of conduits to each of said wells.

3. An apparatus of claim 2, further including a dispersion member positioned in the fluid flow path between said pump and said wells, said dispersion member capable of dispersing solution passing therethrough such that fluid pressure can be substantially uniformly distributed across a cross-section of each of said wells, said cross-section being substantially perpendicular to the gravitational force.

4. An apparatus of claim 3, wherein said dispersion member is a glass frit having a porosity of 10 microns to 1 mm.

5. An apparatus of claim 1, wherein said pump is capable of delivering an outward cyclic solution flow, such that said outward flow occurs in a repetitive cycle.

6. An apparatus of claim 5, wherein said pump is capable of delivering flow rates in a sinusoidal cycle, such that there exists a maximum outward flow amplitude and a minimum outward flow amplitude in each cycle.

7. An apparatus of claim 6, wherein said pump is a diaphragm pump.

8. An apparatus of claim 6, further including a means for cycling the pump on and off in a repetitive fashion.

* * * * *